US012765565B2

(12) United States Patent
Schultz et al.

(10) Patent No.: US 12,765,565 B2
(45) Date of Patent: Oct. 20, 2026

(54) APPARATUS AND METHOD FOR MANUFACTURING SAUSAGES

(71) Applicant: Freddy Hirsch Group AG, Hunenberg (CH)

(72) Inventors: Hermann August Schultz, Cape Town (ZA); Heindrich Fritz, Amsterdam (NL); Jacobus Martin Laubscher, Somerset West (ZA)

(73) Assignee: Freddy Hirsch Group AG, Hunenberg (CH)

( * ) Notice: Subject to any disclaimer, the term of this patent is extended or adjusted under 35 U.S.C. 154(b) by 0 days.

(21) Appl. No.: 19/474,954

(22) PCT Filed: Apr. 9, 2024

(86) PCT No.: PCT/IB2024/053457

§ 371 (c)(1),
(2) Date: Oct. 13, 2025

(87) PCT Pub. No.: WO2024/214001

PCT Pub. Date: Oct. 17, 2024

(65) Prior Publication Data

US 2026/0231964 A1 Aug. 13, 2026

(30) Foreign Application Priority Data

Apr. 13, 2023 (ZA) ................................ 2023/04360

(51) Int. Cl.
*A22C 11/00* (2006.01)
*A22C 11/02* (2006.01)
(Continued)

(52) U.S. Cl.
CPC .......... *A22C 11/0245* (2013.01); *A22C 11/10* (2013.01); *A22C 13/0003* (2013.01); *A22C 2013/0023* (2013.01)

(58) Field of Classification Search
CPC . A22C 11/0245; A22C 11/10; A22C 13/0003; A22C 2013/0023
(Continued)

(56) References Cited

U.S. PATENT DOCUMENTS 5,147,239 A 9/1992 Staudenrausch
5,947,809 A 9/1999 Schliesser et al.
(Continued)

OTHER PUBLICATIONS

Search Report and Written Opinion issued for International Patent Application No. PCT/IB2024/053457, dated Jul. 9, 2024, ISA/EP, 11 pages.

*Primary Examiner* — Richard T Price, Jr.
(74) *Attorney, Agent, or Firm* — Haynes and Boone, LLP; Mark A. Tidwell

(57) ABSTRACT

A method and apparatus 10 for manufacturing sausages comprising a meat filler and a settable alginate gel casing paste forming a circumfused casing layer on the filler surface of the filler, includes a rotatable coextrusion head 12 for coextruding the filler and the casing paste so as to form a continuous sausage rope which is twisted and formed into sausage portions. The filler and the casing paste are fed to the coextrusion head via meat pump 28 and gel pump 32. A fixing solution for setting the casing paste is fed via a pump 34 onto the extruded casing paste as it is discharged from the coextrusion head. Two continuous belts 36.1 and 36.2 grip and pull the sausage rope from the coextrusion head while holding the sausage rope against rotation. Time intervals for formation of voids and twist between sausage portions, are controlled by a controller 38 to take place immediately after extrusion while the casing material is in a partially set state and prior to full solidification and setting of the casing material.

17 Claims, 7 Drawing Sheets

(51) Int. Cl.
*A22C 11/10* (2006.01)
*A22C 13/00* (2006.01)

(58) Field of Classification Search
USPC .............................................................. 452/30
See application file for complete search history.

(56) References Cited

U.S. PATENT DOCUMENTS

| | | | | |
|---|---|---|---|---|
| 7,244,171 | B2 * | 7/2007 | Muller ................... | A22C 11/02<br>452/33 |
| 7,591,717 | B2 | 9/2009 | Bächtle et al. | |
| 2003/0228837 | A1 | 12/2003 | Reutter et al. | |
| 2015/0183584 | A1 * | 7/2015 | Marshall ................ | B65G 17/46<br>198/850 |
| 2021/0259261 | A1 | 8/2021 | Schliesser et al. | |

* cited by examiner

APPARATUS AND METHOD FOR MANUFACTURING SAUSAGES

PRIORITY CLAIM

The present application is a U.S. National Stage patent application of International Patent Application No. PCT/IB2024/053457, filed Apr. 9, 2024, which claims priority to South African Patent Application No. 2023/04360, filed Apr. 13, 2023, the benefit of which is claimed and the disclosures of which are incorporated herein by reference in their entirety.

TECHNICAL FIELD

This invention relates to an apparatus and method for manufacturing sausages. It relates particularly to an apparatus and method for forming a sausage rope which is divided into individual sausage portions wherein a twist is applied to the sausage casing in the region of divisions between the sausage portions.

This invention is concerned with an apparatus and method for manufacturing sausages of a type comprising a sausage filler paste mass and a settable casing paste material wherein the casing paste material sets to form a circumfused casing layer on the surface of the sausage filler paste mass.

BACKGROUND TO INVENTION

U.S. Pat. No. 5,147,239 (Albert Handtmann Maschinenfabrief GmbH & Co. KG) discloses a method for making sausages wherein sausage meat is filled into a preformed sausage skin formed from animal gut, to form a sausage rope. The sausage rope is then divided into individual sausage portions by twisting the rope between adjacent sausage portions. In order to divide the sausage rope into sausage portions, voids are formed in the sausage rope at predetermined spaced intervals by pulling a leading sausage portion forwards at a speed greater than the sausage meat expulsion speed. A twist is then applied to the preformed sausage casing in the region of the voids.

The manufacture of sausages comprising a sausage filler paste mass and a settable casing paste material which is set around the sausage filler paste mass to form a casing layer which adheres to the surface of the sausage filler paste mass, poses a problem when attempting to divide the sausage rope into sausage portions and applying a twist to the casing between the sausage portions for sealing off the sausage portions from one another, due to the properties of the casing layer and its attachment to the underlying sausage filler paste mass.

The disclosure in U.S. Pat. No. 7,591,717 (Albert Handtmann Maschinenfabrief GmbH & Co. KG) attempts to address the abovementioned problem by providing a coextrusion head comprising a filling tube for the ejection of a filler paste mass and an extrusion die for ejection of a settable casing paste material, wherein the filling tube projects beyond the annulus through which the casing material is extruded. The casing material is extruded onto the outer surface of the filling tube, where the casing material is allowed to solidify and set after a period of time. A fixing solution is applied to the casing paste material when it is located on the filling tube providing for quick setting of the casing material. The extruded casing material is located on the filling tube in order to support the casing material until it solidifies and sets and increases in strength, prior to the casing material being attached to the surface of the filler paste mass. In order to allow the extruded casing material to move along the surface of the filling tube in the direction of the filling tube end, the surface of the filling tube typically has a low sliding coefficient of friction. In addition, a liquid lubricant is introduced between the casing and the filling tube in order to further reduce sliding friction between the casing material and the filling tube.

While allowing the casing material to solidify and set on the filling tube prior to attaching the casing material to the filler paste mass, results in the casing material exhibiting increased strength, the use of a projecting filling tube has been found to lead to a problem wherein the set casing material loses its adherence properties as it sets causing the solidified and set casing material to not adhere sufficiently to the filler paste mass after discharge from the filling tube. This problem is exacerbated by the use of a lubricant which is introduced between the extruded casing material and the filling tube in order to further reduce sliding of friction between the casing material and the filling tube. More specifically, some of the lubricant introduced between the extruded casing material and the filling tube, is carried over to the filler paste mass where the lubricant forms a layer between the surface of the filler paste mass and the set casing material resulting in problems with adherence of the casing material to the filler paste mass. Furthermore, when heating sausage portions in a post-extrusion cooking process, the lubricant is known to cause a problem with detachment of the casing from the filler paste mass due, in part, to different thermal expansion properties of the lubricant to the filler mass and casing material.

A further problem with the apparatus and method disclosed in U.S. Pat. No. 7,591,717 is that as the casing solidifies and sets on the filling tube, it becomes less pliable and deformable which does not allow for complete sealing of sausage portions prior to cooking.

It is an object of the present invention to ameliorate the abovementioned problems associated with prior art apparatus for forming individual sausage portions from a sausage rope comprising a filler paste mass and a casing formed from a settable casing paste material.

SUMMARY OF INVENTION

According to a first aspect of the invention there is provided an apparatus for manufacturing sausages, including:

- a rotatable coextrusion head for coextruding a sausage filler paste mass and a settable casing paste material so as to form a continuous sausage rope wherein the casing paste material sets over a predetermined period of time on the surface of the sausage filler paste mass to form a circumfused casing layer on the surface of the sausage filler paste mass;
- a first pumping device for feeding the sausage filler paste mass to the coextrusion head;
- a second pumping device for feeding the casing paste material to the coextrusion head;
- a third feed device for feeding a fixing solution onto the extruded casing paste material;
- a conveyor for gripping the sausage rope for pulling the sausage rope from the coextrusion head while holding the sausage rope against rotation; and
- a controller which is operable at predetermined time intervals after coextrusion of the filler paste mass and the casing paste material and prior to complete setting of the casing paste material, to control a speed of the conveyor relative to a feed rate of first pumping device such that the sausage rope is pulled at a speed greater than the speed of expulsion of the sausage filler paste mass so as to stretch the sausage rope at regions defining voids in the sausage rope; and simultaneously cause the extrusion head to rotate in order to form a twist in the sausage rope at said regions.

The controller may be operable, at or near commencement of each time interval, to generate control signals for:

- reducing the speed of expulsion of the sausage filler paste mass until a feed of the sausage filler paste mass is stopped;
- causing the extrusion head to rotate; and
- reducing the speed at which the sausage rope is pulled from the extrusion head until a predetermined reduced speed is achieved.

The controller may be operable, near at or near an end of each interval, to generate control signals for:

- increasing the speed of expulsion of the sausage filler paste mass until the speed of the sausage filler paste mass returns to the expulsion speed prior to commencement of the interval;
- slowing and ceasing rotation of the extrusion head; and
- increasing the speed at which the sausage rope is pulled from the extrusion head until the speed of the sausage rope returns to the speed prior to commencement of the interval.

The controller may be operable to provide for a pre-void formation time delay at the commencement of the interval, by controlling a feed rate of the first pumping device and the speed of the conveyor such that the feed rate of the first pumping device is reduced a predetermined time period prior to reducing the speed of the conveyor, while the extrusion head is caused to rotate. In use, shifting the commencement of a reduction in the feed rate of the first pumping device from a reduction in speed of the conveyor, permits the length of a void formed between sausage portions, to be varied.

The controller may be operable to provide for a post-void formation delay, wherein prior to the end of the interval, by controlling a feed rate of the first pumping device and the speed of the conveyor such that the feed rate of the first pumping device is increased prior to an increase in the speed of the conveyor, while the extrusion head is caused to rotate. In use, shifting the commencement of an increase in the feed rate of the first pumping device from an increase in speed of the conveyor, permits the length of the twisted casing material between sausage portions to be stretched or compressed.

According to a second aspect of the invention there is provided a method for manufacturing sausages including:

- using a rotatable coextrusion head, coextruding a sausage filler paste mass and a settable casing paste material so as to form a continuous sausage rope wherein the casing paste material is extruded directly onto the sausage filler paste mass where the casing material adheres to the sausage filler paste mass and sets over a predetermined period of time to form a circumfused casing layer on the surface of the sausage filler paste mass;
- gripping and pulling the sausage rope from the coextrusion head while holding the sausage rope against rotation; and
- at predetermined time intervals after coextrusion of the filler paste mass and the casing paste material and prior to complete setting of the casing paste material, forming individual sausage portions in the sausage rope by pulling the sausage rope at a speed greater than a speed of expulsion of the sausage filler paste mass so as to stretch the sausage rope at regions defining voids in the sausage rope; and simultaneously causing the extrusion head to rotate in order to form a twist in the sausage rope at said regions.

The method may include, at or near commencement of each time interval:

- reducing the speed of expulsion of the sausage filler paste mass until a feed of the sausage filler paste mass is stopped;
- causing the extrusion head to rotate;
- reducing the speed at which the sausage rope is pulled from the extrusion head until a predetermined reduced speed is achieved.

The method may include, near at or near an end of each time interval:

- increasing the speed of expulsion of the sausage filler paste mass until the speed of the sausage filler paste mass returns to the expulsion speed prior to commencement of the interval;
- slowing and ceasing rotation of the extrusion head;
- increasing the speed at which the sausage rope is pulled from the extrusion head until the speed of the sausage rope returns to the speed prior to commencement of the interval.

The method may include providing a first pumping device for feeding the sausage filler paste mass to the coextrusion head; providing a second pumping device for feeding the casing paste material to the coextrusion head; providing a third feed device for feeding a fixing solution onto the extruded casing paste material; and providing a conveyor for gripping the sausage rope for pulling the sausage rope from the coextrusion head while holding the sausage rope against rotation.

The method may include a pre-void formation time delay wherein, at the commencement of the interval, a feed rate of the first pumping device is reduced a predetermined time period prior to reducing the speed of the conveyor, while the extrusion head is caused to rotate. In use, shifting the commencement of a reduction in the feed rate of the first pumping device from a reduction in speed of the conveyor, permits the length of a void formed between sausage portions, to be varied.

The method may include a post-void formation delay, wherein prior to the end of the interval, a feed rate of the first pumping device is increased prior to an increase in the speed of the conveyor, while the extrusion head is caused to rotate. In use, shifting the commencement of an increase in the feed rate of the first pumping device from an increase in speed of the conveyor, permits the length of the twisted casing material between sausage portions to be stretched or compressed.

BRIEF DESCRIPTION OF THE DRAWINGS

Further features of the invention are described hereinafter by way of a non-limiting example of the invention, with reference to and as illustrated in the accompanying diagrammatic drawings. In the drawings.

DETAILED DESCRIPTION OF THE DRAWINGS

Figure 1:
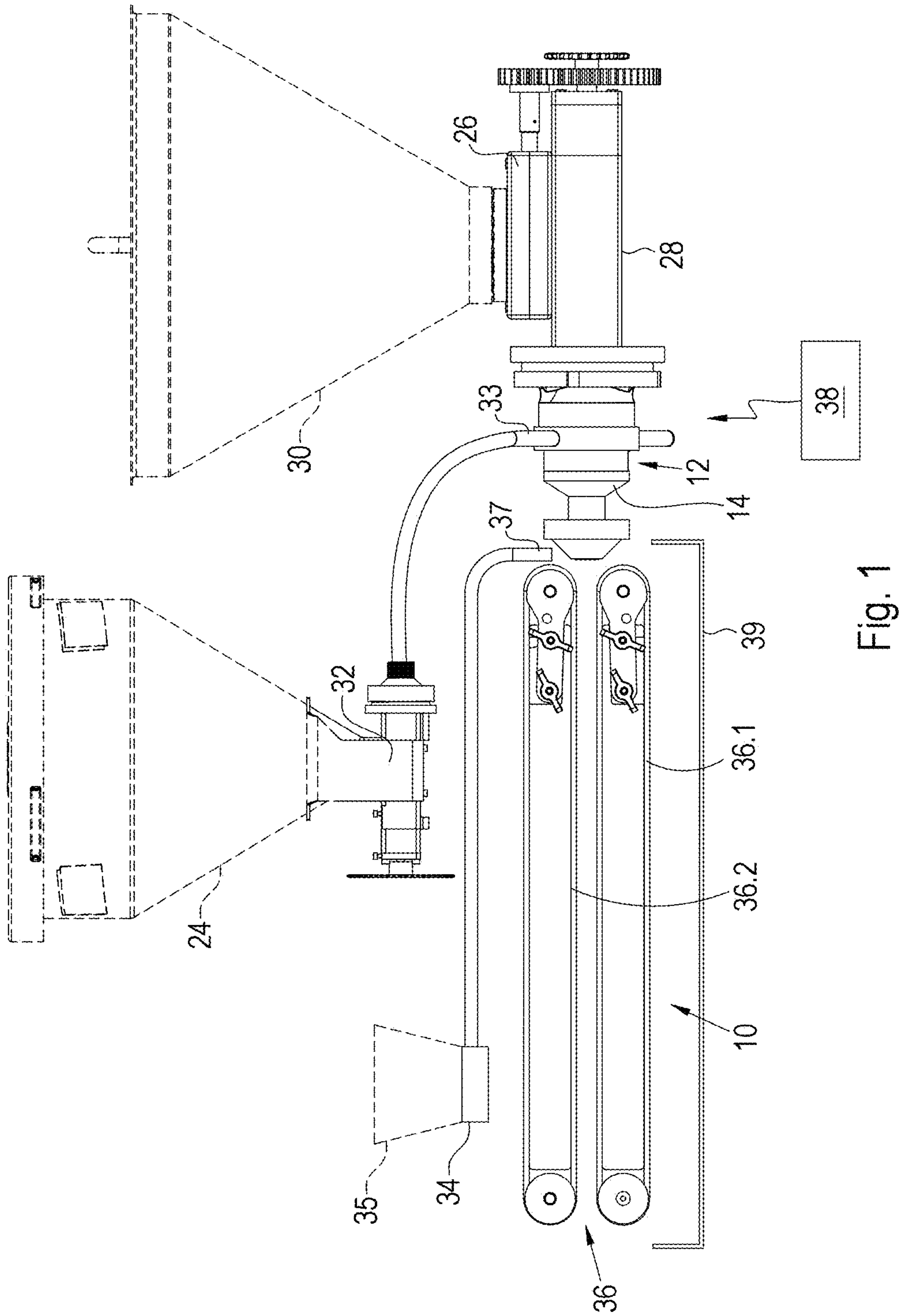
FIG. 1 shows a schematic side view of an apparatus for manufacturing sausages in accordance with the invention.
Figure 2:
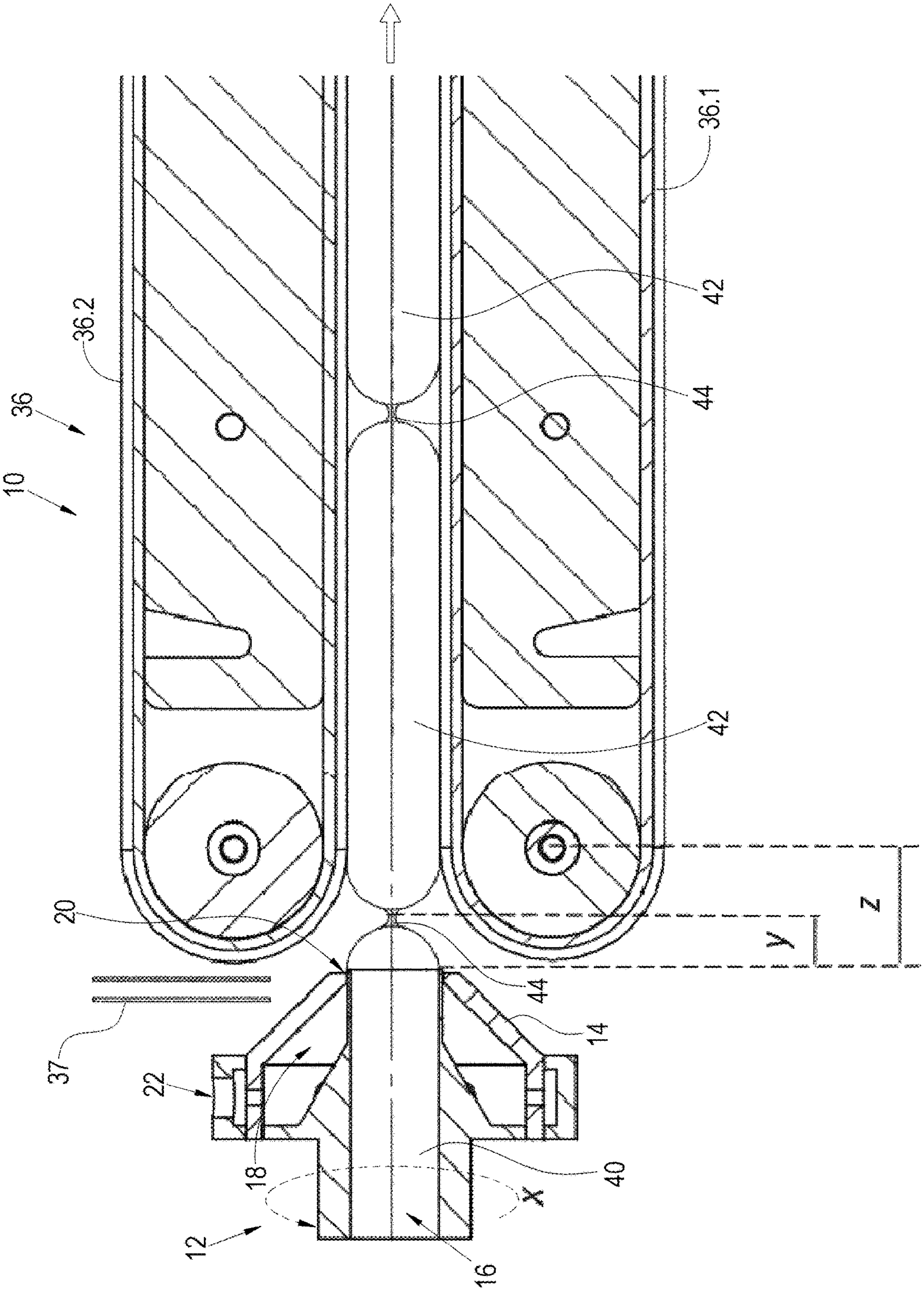
FIG. 2 shows an enlarged fragmentary sectional side view of the sausage manufacturing apparatus of FIG. 1.

With reference to FIGS. 1 and 2 of the drawings, an apparatus for manufacturing sausages in accordance with the invention, is designated by the reference numeral 10.

The sausages comprise, for example, a meat filler paste mass and a settable alginate gel casing paste material forming a circumfused casing layer on the surface of the filler paste mass.

The apparatus 10 includes a rotatable coextrusion head 12 for coextruding the filler paste mass and the casing paste material so as to form a continuous sausage rope wherein the casing paste material sets over a predetermined period of time on the surface of the filler paste mass to form a circumfused casing layer on the surface of the filler paste mass. The coextrusion head 12 comprises a housing 14 defining a central passage 16 along which the meat filler paste mass is fed under pressure. The housing includes an annular die cavity 18 through which the casing material is extruded via an annular gap 20 onto the extruded filler paste mass. An inlet port 22 is provided through which the casing material is conveyed to the die cavity from a supply of the casing material held in a hopper 24. The coextrusion is rotatably supported on bearings in an arrangement wherein controlled rotation is imparted to the coextrusion head via a drive motor 26.

The apparatus further includes a first pumping device in the form of a meat pump 28 for feeding the filler paste mass from a hopper 30 in which the filler paste mass in held in the form of a meat emulsion. The meat pump 28 is arranged in-line with the central feed passage 16 of the coextrusion head 12. As such, the filler paste mass is fed under into the central feed passage.

A second pumping device in the form of a gel pump 32 is provided for feeding the casing paste material from the hopper 24 to the inlet port 22 of the coextrusion head 12 via a feed pipe 33. A third feed device in the form of a fixing solution pump 34 is provided for feeding a calcium chloride fixing solution from a tank 35 holding a supply of the fixing solution, onto the extruded casing paste material as it is discharged from the coextrusion head through the annular gap 20 via a feed pipe 37. A fixing solution catchment tray 39 is provided for collecting excess fixing solution for return to the tank 35.

The apparatus also includes a conveyor 36 comprises two opposed continuous belts 36.1 and 36.2 for gripping the sausage rope for pulling the sausage rope from the coextrusion head while holding the sausage rope against rotation. The belts are synchronously driven via pulleys for pulling extruded sausage portions in a direction away from the coextrusion head.

The casing material is extruded through the annular gap 20 directly onto the filler paste mass in an unset state. Contact with the fixing solution causes solidification and setting of the casing material over a predetermined time period. Depending on factors such as ambient temperature, the properties of the fixing solution and of the casing material, solidification and setting of the casing material typically occurs 300 milliseconds after contact with the fixing solution. As such, the time intervals for formation of the voids and twist between sausage portions, are controlled by the controller 38 to take place immediately after extrusion while the casing material is in a partially set state and therefore prior to full solidification and setting of the casing material. This is a particularly important feature of the present invention as is explained in further detail hereinbelow.

The apparatus 10 includes a controller 38 for controlling the operation of the drive motor 26, the meat pump 28, the gel pump 32 and the conveyor 36 as is explained hereinbelow.

A method for manufacturing sausages in accordance with the invention, includes using the rotatable coextrusion head 12, coextruding the meat filler paste mass and the alginate gel casing paste material so as to form a continuous sausage rope 40 wherein the casing paste material is extruded directly onto the sausage filler paste mass where the casing material adheres to the sausage filler paste mass and sets over a predetermined period of time to form a circumfused casing layer on the surface of the sausage filler paste mass.

The method includes gripping and pulling the sausage rope from the coextrusion head 12 while holding the sausage rope against rotation by means of the conveyor 36.

At predetermined time intervals after coextrusion of the filler paste mass and the casing paste material and prior to complete setting of the casing paste material, individual sausage portions 42 are formed in the sausage rope by pulling the sausage rope at a speed greater than a speed of expulsion of the sausage filler paste mass so as to stretch the sausage rope at regions and define voids 44 in the sausage rope. During these time intervals, the extrusion head to caused to rotate in order to form a twist in the sausage rope at the voids.

During the formation of the voids 44 separating the sausage rope into individual sausage portions 42, the casing remains in a partially set state wherein the casing material is pliable and readily deformable and exhibits good adherence properties for adhering to the filler paste mass.

At or near commencement of each time interval, the speed of expulsion of the sausage filler paste mass is reduced until a feed of the sausage filler paste mass is stopped, the extrusion head is caused to rotate, and the speed at which the sausage rope is pulled from the extrusion head is reduced. In order to bring the feed of filler paste material to a stop. The direction of the meat pump is reversed before stopping the pump so as to arrest the momentum of the filler paste material.

At or near an end of each time interval, the speed of expulsion of the sausage filler paste mass is increased until the speed of the sausage filler paste mass returns to the expulsion speed prior to commencement of the interval, rotation of the rotation of the extrusion head is slowed and caused to cease, and the speed at which the sausage rope is pulled from the extrusion head is increased until the speed of the sausage rope returns to the speed prior to commencement of the interval.

Figure 3:
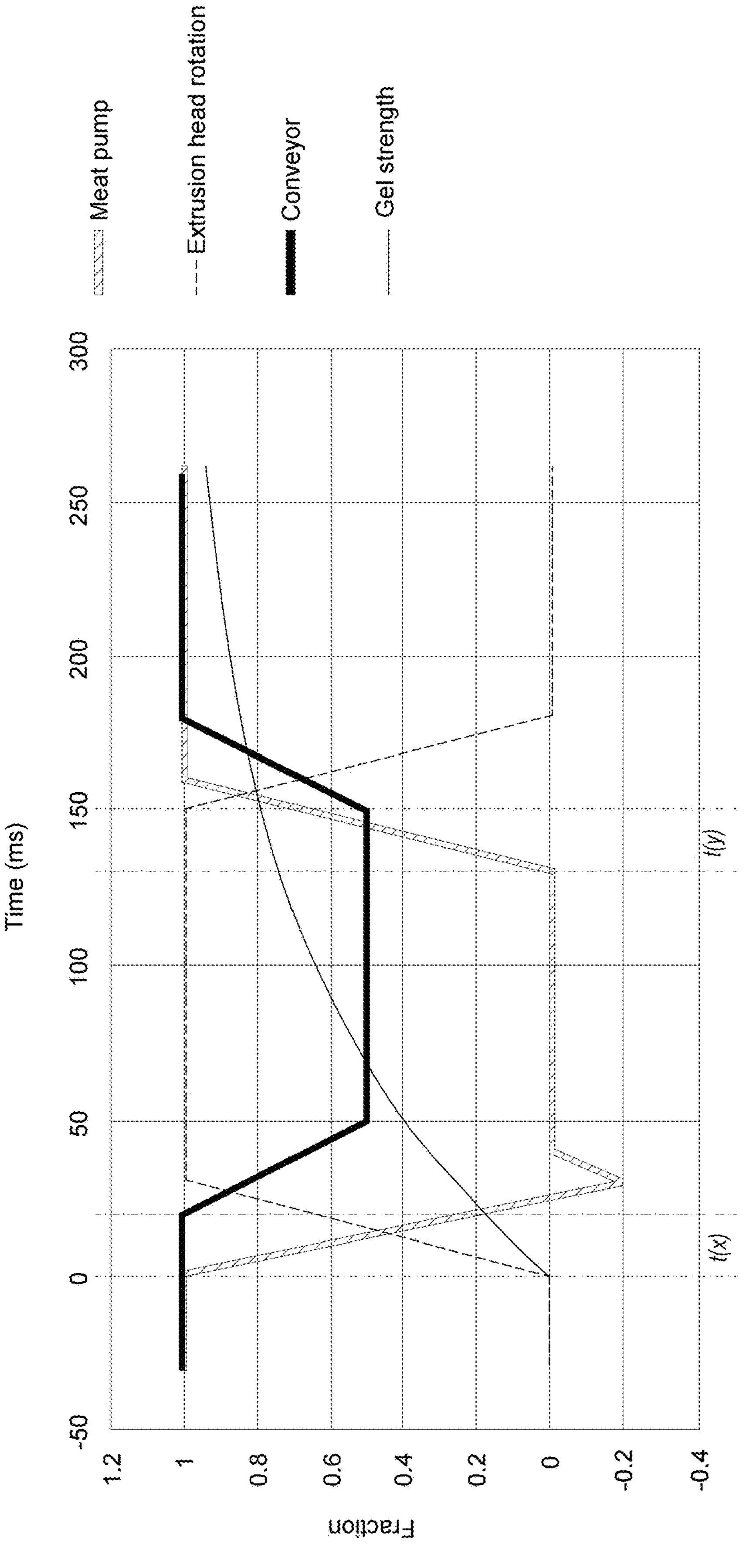
FIG. 3 shows a graph illustrating the controlled interaction between components of the apparatus of FIG. 1, providing for the formation of a void and twist between sausage portions of a sausage rope in accordance with a method for manufacturing sausages in accordance with the invention.
Figure 4:
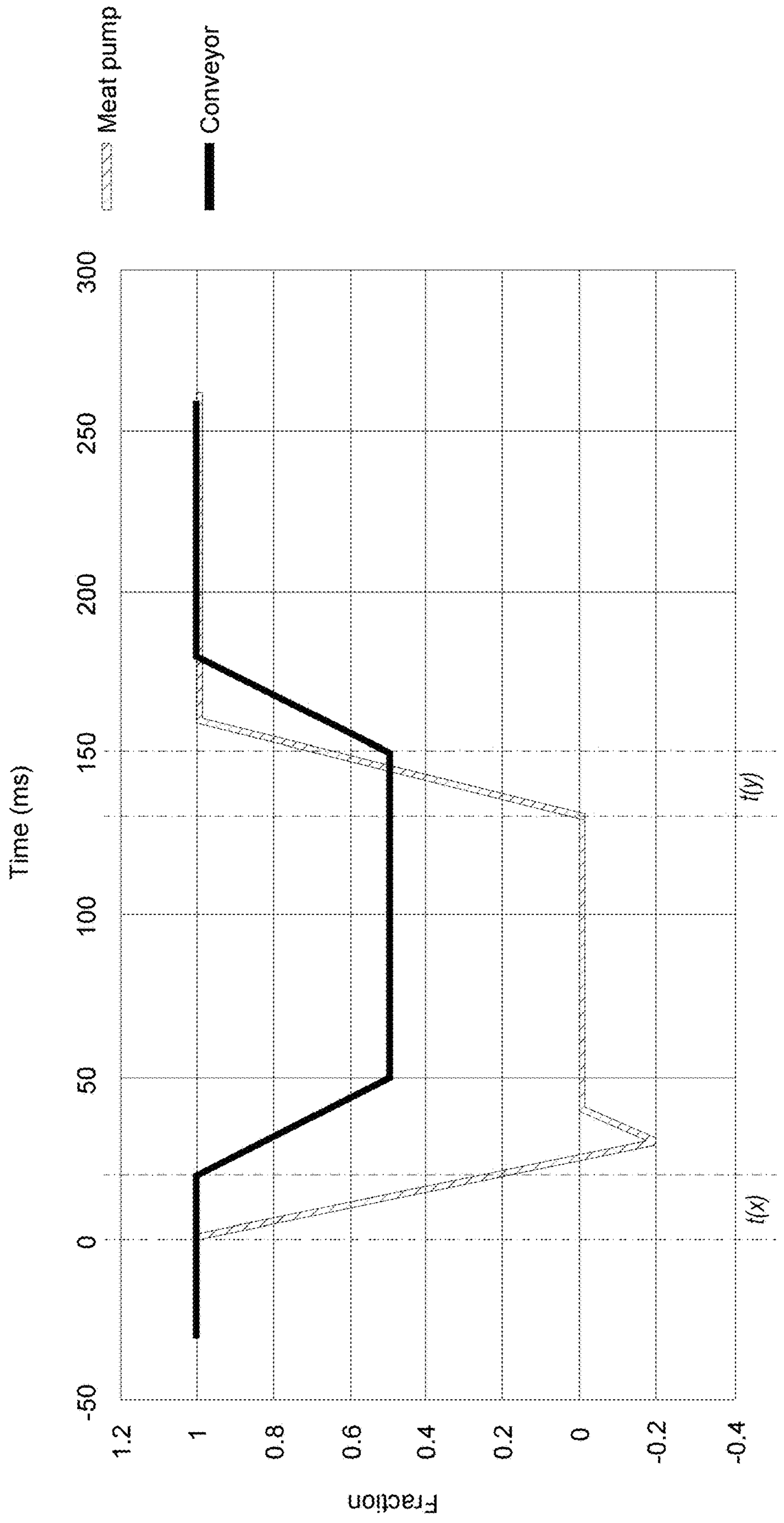
FIG. 4 shows a simplified graph extracted from the graph of FIG. 3, illustrating the relationship between the operation of the meat pump and the conveyor of the apparatus of FIG. 1.
Figure 5:
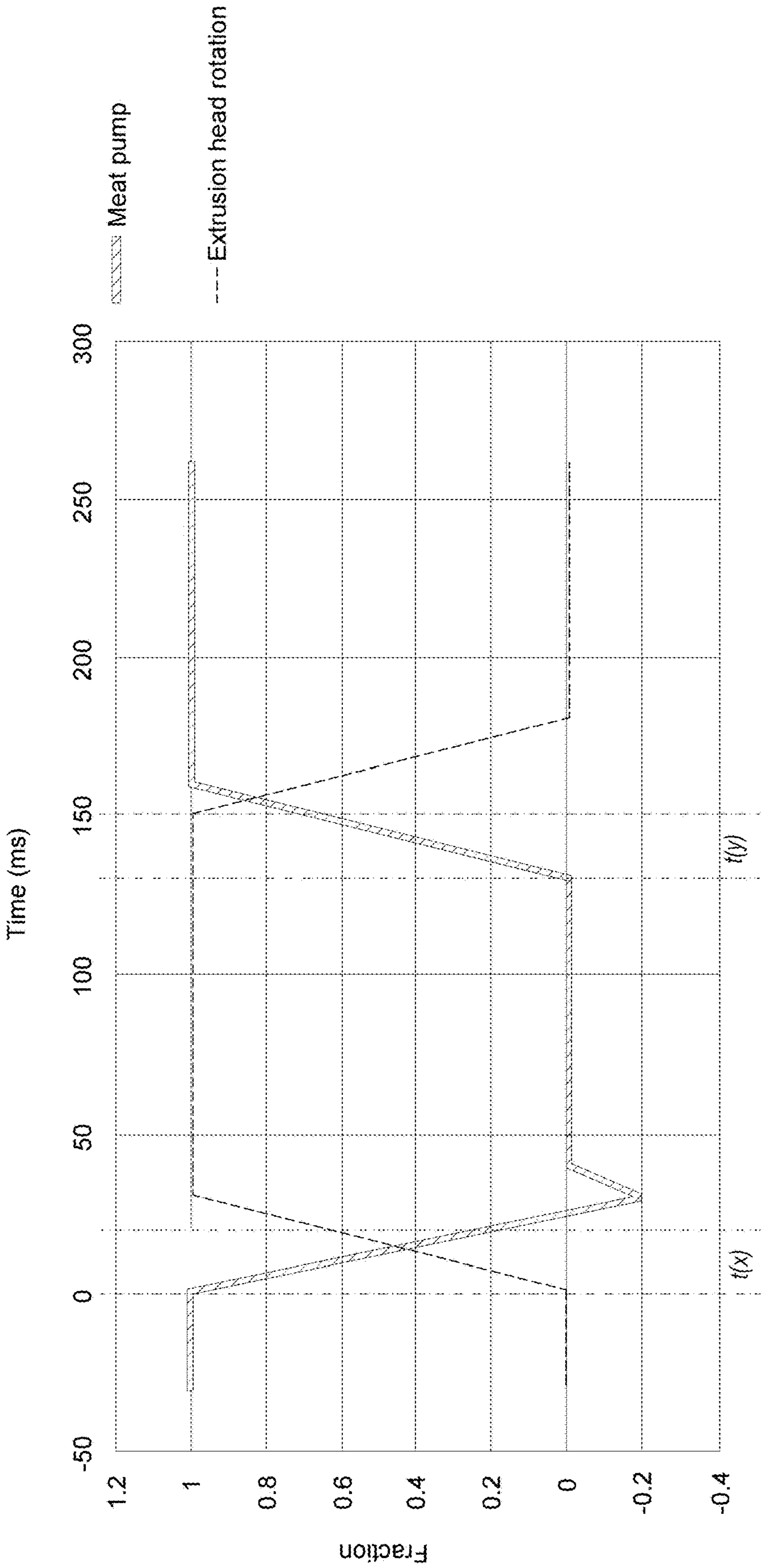
FIG. 5 shows a simplified graph extracted from the graph of FIG. 3, illustrating the relationship between the operation of the meat pump and the extrusion head of the apparatus of FIG. 1.

With reference to FIGS. 3 to 5, graphs illustrating the controlled interaction between components of the apparatus

10 for forming the voids 44 and a twist between the sausage portions 42 of the sausage rope 40, are shown.

As is apparent from the graphs, the method includes an active phase wherein the coextrusion head 12 does not rotate and the meat pump 28 and the conveyor 36 operate at a baseline feed rate and speed, respectively. The method further includes a void and twist formation phase wherein the coextrusion head rotates and the meat pump 28 slows and stops and the speed of the conveyor 36 reduces.

A pre-void formation time delay t (x) is set at the commencement of each time interval, wherein the feed rate of the meat pump 28 is reduced prior to reducing the speed of the conveyor 36, while the extrusion head 12 is caused to rotate. In use, shifting of the commencement of a reduction in the feed rate of the meat pump 28 from the commencement of a reduction in speed of the conveyor 36, permits the length of a void formed between sausage portions, to be varied.

A post-void formation time delay t (y) is set prior to the end of each time interval, wherein the feed rate of the meat pump 28 is increased prior to increasing the speed of the conveyor 36, while the extrusion head continues to rotate at full speed. In use, shifting of the commencement of an increase in the feed rate of the meat pump from the commencement of an increase in speed of the conveyor, permits the length of the twisted casing material between sausage portions to be stretched or compressed.

Figure 6:
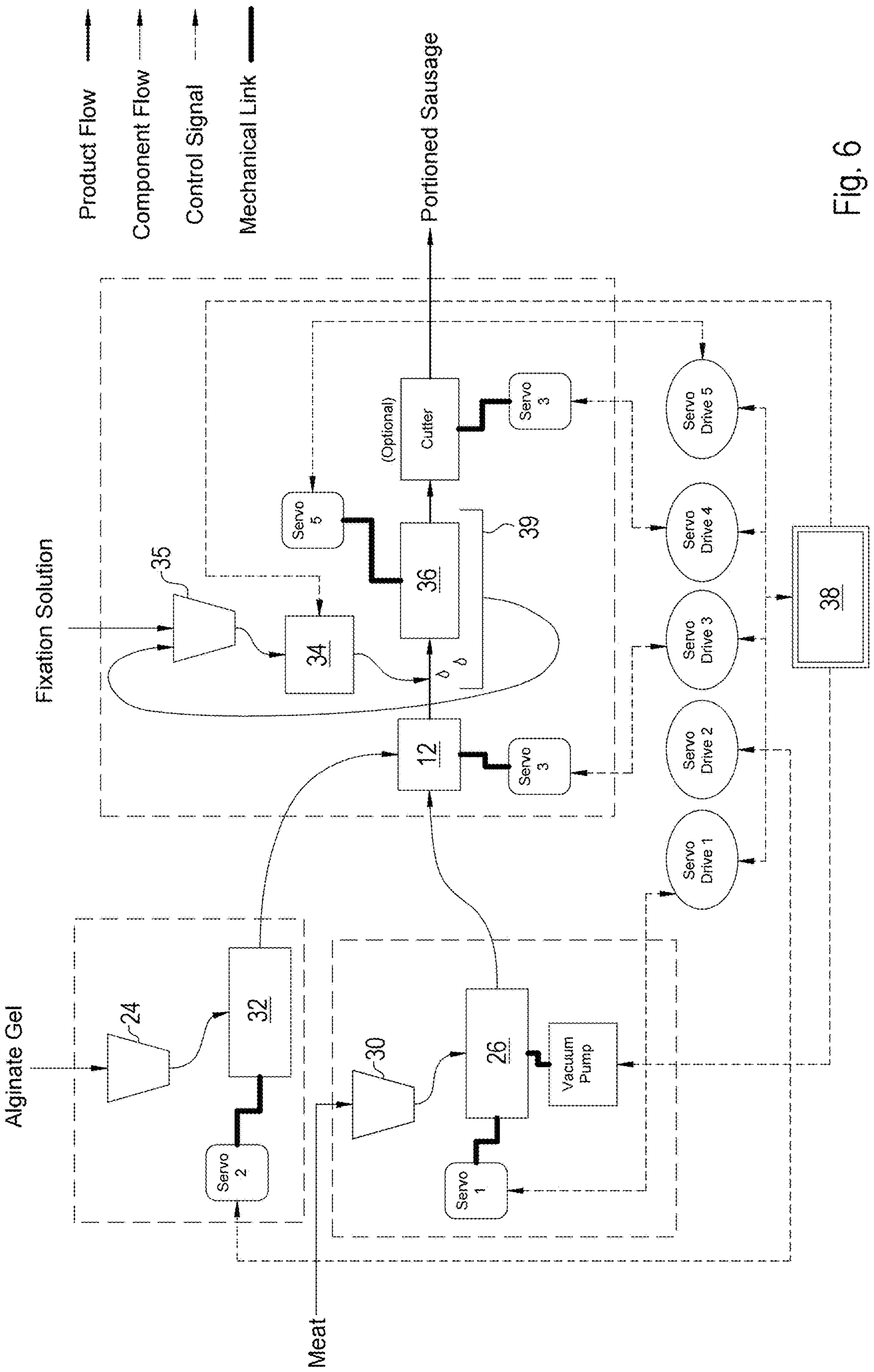
FIG. 6 shows a schematic block diagram illustrating the various components of the apparatus of FIG. 1.

FIG. 6 provides a diagrammatic overview of the apparatus and method in accordance with the invention.

Figure 7:
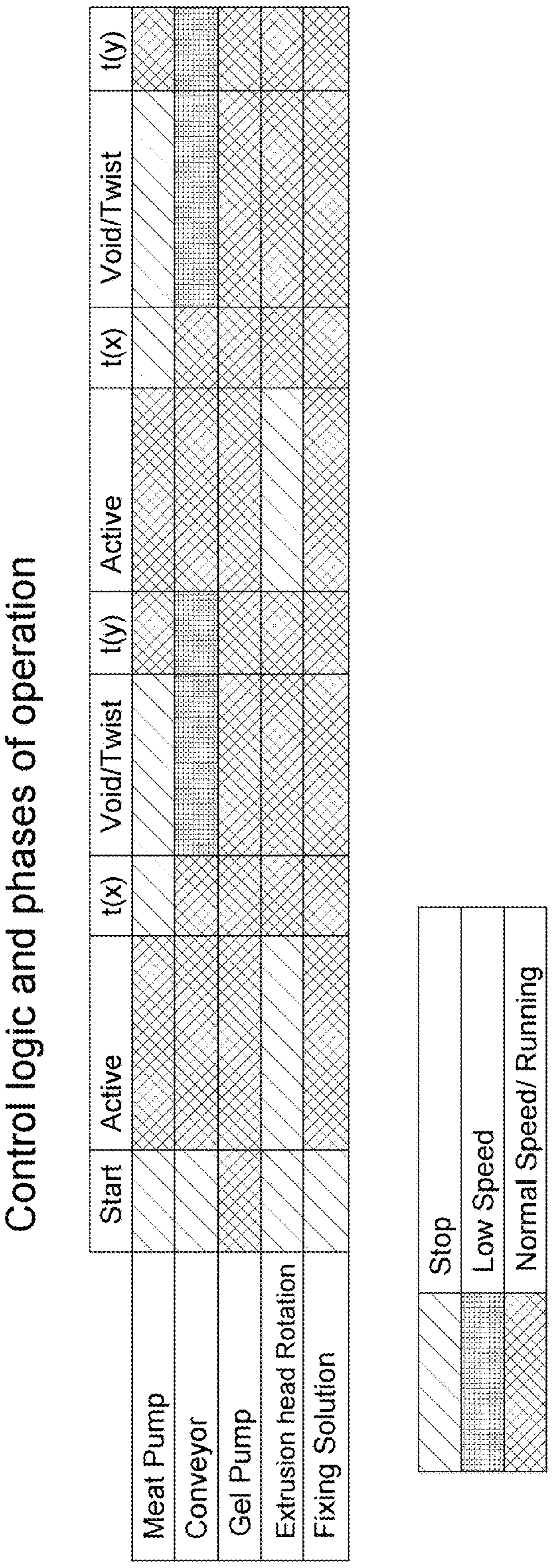
FIG. 7 shows a diagram illustrating control logic of the controller and phases of operation of the components of the apparatus of FIG. 1.

In FIG. 7, the control logic and phases of operation of the apparatus and method in accordance with the invention, are illustrated.

The commencement and end of the void and twist formation phases are strictly time controlled such that the formation of the voids and the application of a twist to the casing material in the region of the voids occurs prior to the casing material solidifying and setting fully. As such, the casing material retains its adherence properties allowing it to adhere effectively to the underlying filler paste mass, while being sufficiently deformable and pliable so as to allow a sufficient degree of stretch during the formation of voids in the sausage rope and twist in the region of the voids without rupturing. The twist is therefore applied to the sausage rope while the casing material is in a semi-set, but not fully set state. As can be seen from the graphs, the alginate gel casing material has not set completely nor attained full strength during each void and twist formation phase.

By directly extruding the alginate gel casing material onto the filler paste mass immediately after discharge from the coextrusion head, while the gel casing material is in a partially set state, the adherence properties of the casing material are not materially affected. Furthermore, the casing material, being more workable in a partially set state, provides the casing material with a greater degree of deformability which greatly assists in the formation of voids between sausage portions and the application of a twist to the casing material in the region of the voids. The semi-set state of the casing material promotes greater adhesion of the casing material to the underlying filler paste mass and sealing of ends of the sausage portions. Forming the voids and twists between sausage portions while the casing material is in a semi-set, but not fully set state, allows the use of a casing formulation which is optimally soft and pliable once set fully, providing for enhanced adhesion of the casing material to the underlying filler paste material. As the casing material continues to set and attain full strength after the formation of the voids and twist, the twisted casing solidifies and hardens in its twisted state providing a strong link between the sausage portions exhibiting a high degree of twist memory. The twisted voids in the casing material between the individual sausage portions 42 effectively seal off the ends of the sausage portions. The twisted voids formed in accordance with the invention provide an effective closure for sealing the ends of the sausage portions.

The pre-void formation time delay t (x) which is set at the commencement of each time interval, wherein the feed rate of the meat pump 28 is reduced prior to reducing the speed of the conveyor 36, while the extrusion head 12 is caused to rotate, while the gel pump 32 runs at constant speed, allows for an increase in the amount of gel which is deposited in the region of the voids providing for a thicker casing material layer in the region of the voids compared to the remainder of the sausage sections, providing for increased strength in the casing material in the region of the twists.

After formation of the individual sausage portions, the casing material can optionally be cut in the region of the twisted voids in order to separate the sausage portions. Alternatively, the sausage portions can remain in a linked, unseparated condition for transport or further processing such as cooking.

The invention claimed is:

1. An apparatus for manufacturing sausages, including:

a rotatable coextrusion head for coextruding a sausage filler paste mass and a settable casing paste material so as to form a continuous sausage rope wherein the casing paste material sets over a predetermined period of time on the surface of the sausage filler paste mass to form a circumfused casing layer on the surface of the sausage filler paste mass;

a first pumping device for feeding the sausage filler paste mass to the coextrusion head;

a second pumping device for feeding the casing paste material to the coextrusion head;

a third feed device for feeding a fixing solution onto the extruded casing paste material;

a conveyor for gripping the sausage rope for pulling the sausage rope from the coextrusion head while holding the sausage rope against rotation; and a controller which is operable at predetermined time intervals after coextrusion of the filler paste mass and the casing paste material and prior to complete setting of the casing paste material, to control a speed of the conveyor relative to a feed rate of first pumping device such that the sausage rope is pulled at a speed greater than the speed of expulsion of the sausage filler paste mass so as to stretch the sausage rope at regions defining voids in the sausage rope; and simultaneously cause the extrusion head to rotate in order to form a twist in the sausage rope at said regions.

2. The apparatus as claimed in claim 1, wherein the controller is operable, at or near commencement of each time interval, to generate control signals for:

reducing the speed of expulsion of the sausage filler paste mass until a feed of the sausage filler paste mass is stopped;

causing the extrusion head to rotate; and reducing the speed at which the sausage rope is pulled from the extrusion head until a predetermined reduced speed is achieved.

3. The apparatus as claimed in claim 1, wherein the controller is operable, near at or near an end of each interval, to generate control signals for:

increasing the speed of expulsion of the sausage filler paste mass until the speed of the sausage filler paste mass returns to the expulsion speed prior to commencement of the interval;

slowing and ceasing rotation of the extrusion head; and increasing the speed at which the sausage rope is pulled from the extrusion head until the speed of the sausage rope returns to the speed prior to commencement of the interval.

4. The apparatus as claimed in claim 1, wherein the controller is operable to provide for a pre-void formation time delay at the commencement of the interval, by controlling a feed rate of the first pumping device and the speed of the conveyor such that the feed rate of the first pumping device is reduced a predetermined time period prior to reducing the speed of the conveyor, while the extrusion head is caused to rotate.

5. The apparatus as claimed in claim 1, wherein the controller is operable to provide for a post-void formation delay, wherein prior to the end of the interval, by controlling a feed rate of the first pumping device and the speed of the conveyor such that the feed rate of the first pumping device is increased prior to an increase in the speed of the conveyor, while the extrusion head is caused to rotate.

6. A method for manufacturing sausages including:

using a rotatable coextrusion head, coextruding a sausage filler paste mass and a settable casing paste material so as to form a continuous sausage rope wherein the casing paste material is extruded directly onto the sausage filler paste mass where the casing material adheres to the sausage filler paste mass and sets over a predetermined period of time to form a circumfused casing layer on the surface of the sausage filler paste mass;

gripping and pulling the sausage rope from the coextrusion head while holding the sausage rope against rotation; and at predetermined time intervals after coextrusion of the filler paste mass and the casing paste material and prior to complete setting of the casing paste material, forming individual sausage portions in the sausage rope by pulling the sausage rope at a speed greater than a speed of expulsion of the sausage filler paste mass so as to stretch the sausage rope at regions defining voids in the sausage rope; and simultaneously causing the extrusion head to rotate in order to form a twist in the sausage rope at said regions.

7. The method as claimed in claim 6, which includes, at or near commencement of each time interval:

reducing the speed of expulsion of the sausage filler paste mass until a feed of the sausage filler paste mass is stopped;

causing the extrusion head to rotate;

reducing the speed at which the sausage rope is pulled from the extrusion head until a predetermined reduced speed is achieved.

8. The method as claimed in claim 6, which includes, at or near an end of each time interval:

increasing the speed of expulsion of the sausage filler paste mass until the speed of the sausage filler paste mass returns to the expulsion speed prior to commencement of the interval;

slowing and ceasing rotation of the extrusion head;

increasing the speed at which the sausage rope is pulled from the extrusion head until the speed of the sausage rope returns to the speed prior to commencement of the interval.

9. The method as claimed in claim 6, which includes providing a first pumping device for feeding the sausage filler paste mass to the coextrusion head; providing a second pumping device for feeding the casing paste material to the coextrusion head; providing a third feed device for feeding a fixing solution onto the extruded casing paste material; and providing a conveyor for gripping the sausage rope for pulling the sausage rope from the coextrusion head while holding the sausage rope against rotation.

10. The method as claimed in claim 6, which includes a pre-void formation time delay wherein, at the commencement of the interval, a feed rate of the first pumping device is reduced a predetermined time period prior to reducing the speed of the conveyor, while the extrusion head is caused to rotate.

11. The method as claimed in claim 6, which includes a post-void formation delay, wherein prior to the end of the interval, a feed rate of the first pumping device is increased prior to an increase in the speed of the conveyor, while the extrusion head is caused to rotate.

12. The apparatus as claimed in claim 2, wherein the controller is operable, near at or near an end of each interval, to generate control signals for:

increasing the speed of expulsion of the sausage filler paste mass until the speed of the sausage filler paste mass returns to the expulsion speed prior to commencement of the interval;

slowing and ceasing rotation of the extrusion head; and increasing the speed at which the sausage rope is pulled from the extrusion head until the speed of the sausage rope returns to the speed prior to commencement of the interval.

13. The apparatus as claimed in claim 3, wherein the controller is operable to provide for a pre-void formation time delay at the commencement of the interval, by controlling a feed rate of the first pumping device and the speed of the conveyor such that the feed rate of the first pumping device is reduced a predetermined time period prior to reducing the speed of the conveyor, while the extrusion head is caused to rotate.

14. The apparatus as claimed in claim 4, wherein the controller is operable to provide for a post-void formation delay, wherein prior to the end of the interval, by controlling a feed rate of the first pumping device and the speed of the conveyor such that the feed rate of the first pumping device is increased prior to an increase in the speed of the conveyor, while the extrusion head is caused to rotate.

15. An apparatus for manufacturing sausages, including:

a rotatable coextrusion head for coextruding a sausage filler paste mass and a settable casing paste material so as to form a continuous sausage rope wherein the casing paste material sets over a predetermined period of time on the surface of the sausage filler paste mass to form a circumfused casing layer on the surface of the sausage filler paste mass;

a first pumping device for feeding the sausage filler paste mass to the coextrusion head;

a second pumping device for feeding the casing paste material to the coextrusion head;

a third pumping device for feeding a fixing solution onto the extruded casing paste material;

a conveyor for gripping the sausage rope for pulling the sausage rope from the coextrusion head while holding the sausage rope against rotation, the conveyor having a first end and a second end;

a drive motor disposed to rotate the rotatable coextrusion head; and a pipe having a first end in fluid communication with the third pumping device and a second end;

wherein the rotatable coextrusion head includes a central passage in fluid communication with the first pump, an annular die cavity disposed radially outward of the central passage and defining an annular gap about the central passage;

wherein the second end of the pipe is adjacent the annular gap of the rotatable coextrusion head.

16. The apparatus as claimed in claim 15, wherein the first pumping device comprises a hopper with meat filler paste, the second pumping device comprises a hopper with casing paste, and the third pumping device comprises a tank with calcium chloride fixing solution.

17. The apparatus as claimed in claim 15, wherein the conveyor comprises two opposed continuous belts extending away from the rotatable extrusion head, wherein the first end of the conveyor is adjacent the rotatable extrusion head.

* * * * *